(12) United States Patent
Okoniewski

(10) Patent No.: US 8,794,465 B2
(45) Date of Patent: Aug. 5, 2014

(54) WINCH HANDLE HOLDER WITH BEVERAGE HOLDER

(76) Inventor: Michael J. Okoniewski, Hermosa Beach, CA (US)

( * ) Notice: Subject to any disclaimer, the term of this patent is extended or adjusted under 35 U.S.C. 154(b) by 213 days.

(21) Appl. No.: 12/767,504

(22) Filed: Apr. 26, 2010

(65) Prior Publication Data

US 2011/0259932 A1    Oct. 27, 2011

Related U.S. Application Data

(60) Provisional application No. 60/214,729, filed on Apr. 28, 2009.

(51) Int. Cl.
*B65D 21/024*    (2006.01)

(52) U.S. Cl.
USPC .......................... 220/23.4; 220/23.86; 220/6

(58) Field of Classification Search
USPC ............ 220/23.4, 23.8, 23.83, 23.86, 6, 23.2, 220/23.6
See application file for complete search history.

(56) References Cited

U.S. PATENT DOCUMENTS

| | | | | |
|---|---|---|---|---|
| 3,131,829 A * | 5/1964 | Masser | | 206/144 |
| 3,338,628 A | 8/1967 | Evans | | |
| 3,625,393 A * | 12/1971 | Mittel | | 206/173 |
| D323,853 S | 2/1992 | Evenson | | |
| D357,151 S | 4/1995 | Santapa | | |
| 5,423,509 A | 6/1995 | LaPorte et al. | | |
| 5,676,251 A * | 10/1997 | Credle, Jr. | | 206/501 |
| 5,678,740 A | 10/1997 | Wang | | |
| 5,745,565 A | 4/1998 | Wakefield | | |
| D394,300 S | 5/1998 | Samuels et al. | | |
| 5,971,200 A * | 10/1999 | Reynolds | | 220/694 |
| 6,147,162 A * | 11/2000 | Tadokoro et al. | | 525/222 |
| D458,723 S | 6/2002 | Malvasio | | |
| 6,467,665 B1 * | 10/2002 | Jenkins | | 224/628 |
| 6,651,836 B1 * | 11/2003 | Hofheins et al. | | 220/575 |
| 7,726,499 B2 * | 6/2010 | Williamson et al. | | 215/396 |
| 2001/0047999 A1 * | 12/2001 | Henderson, II | | 220/737 |
| 2002/0134781 A1 * | 9/2002 | Ciarrocchi, Jr. | | 220/23.4 |
| 2005/0126064 A1 * | 6/2005 | Winkler | | 43/21.2 |
| 2006/0081747 A1 | 4/2006 | Sherman et al. | | |
| 2006/0113303 A1 * | 6/2006 | Huruta | | 220/23.4 |
| 2008/0295383 A1 * | 12/2008 | Wakefield et al. | | 43/21.2 |
| 2009/0065072 A1 * | 3/2009 | Adamson | | 137/357 |
| 2009/0206099 A1 * | 8/2009 | Davis | | 220/739 |
| 2011/0099883 A1 * | 5/2011 | Baltes | | 43/21.2 |

OTHER PUBLICATIONS

Jamestown Distributors "Ronstan Large Winch Handle Holder" http://www.jamestowndistributors.com/userportal/show_product.do?pid=13892, internet accessed Apr. 15, 2010.

(Continued)

*Primary Examiner* — Stephen Castellano
(74) *Attorney, Agent, or Firm* — Robert J. Lauson; Lauson & Tarver LLP

(57) ABSTRACT

A problem on all sail boats is the winch handle holders being occupied by beverage cans or other small items. A combination boat winch handle holder and beverage holder is made of a first housing adapted to hold the winch handle and mountable to a conventional winch handle holder position. A second housing, shorter and wider than the first, is adapted to hold a beverage can and is attachable in a manner that permits attachment and release of the second housing. The combination holder is preferably made of flexible, stretchable materials that are UV resistant.

5 Claims, 8 Drawing Sheets

(56) References Cited

OTHER PUBLICATIONS

Overstock.com "Kraus Nitor Wall-mounted Double Cub Holder" http://www.overstock.com/Home-Garden/Kraus-Nitor-Wall-mounted-Double-Cup-Holder/ . . . , Internet accessed Apr. 15, 2010.

Jamestown Distributors "drink holders" http://www.jamestowndistributors.com/userportal/search.do?freeText=drink%20holders&resultPref=all&page=GRID&history=, pp. 1-2, internet accessed Apr. 23, 2010.

GO2MARINE "Sea-Dog, Winch Handle Holder, PVC" http://www.go2marine,com/product.do?no=2505F&WT.mc_id=gb1, internet accessed Apr. 15, 2010.

\* cited by examiner

US 8,794,465 B2

WINCH HANDLE HOLDER WITH BEVERAGE HOLDER

CROSS-REFERENCE TO RELATED APPLICATION

This application claims the benefit of the filing date of provisional application No. 60/214,729, filed on Apr. 28, 2009.

BACKGROUND

The winch handle holder is a necessity for sailing vessels. The need to have quick access to the winch handles in a convenient and safe location is a must. The existing holders are singular in their function and dated in their design. Over the years many improvements in sailing and its gear have come to market; however, the winch handle holder has not been one of them. Over the years people have tried to stuff objects other than a winch handle into the holder. Objects such as sunscreen, bottles, cans, cups, GPS devices, and phones. These items often create problems becoming stuck or lodged in the winch handle holder. This can create a safety problem and even the loss of the expensive and needed winch handles. It also creates the danger of not having quick access to the winch handles when needed.

Sailing by nature involves constant movement and action. Sailors over the years have tried to employ many different ways to secure a refreshing beverage while at sea. Some beverage holders are attached to the bulkheads or cockpit seats, while others are affixed to the safety railings by means of a clamping system and some plug into the top of the winch itself, rendering the winch inoperable.

In the above examples the beverage holders by the nature of sailing are often in the way or create a safety issue. They commonly require drilling holes or modifying the boat to work. While operating a sailboat there is much crew movement and action. The previously mentioned beverage holders and systems are often unsightly and in the way, as a result they usually get kicked, backed into or even worse get tangled in the sail lines resulting in damage to the boat or even injury to the crew.

SUMMARY

A holder for a boat winch handle and a beverage can on a boat is made of two housings. One housing can be attached to a boat at a standard winch handle holder mounting position, while the other is connected to it using a detachable and re-attachable connection. The connection may be a groove and tab track system. Both of the housings have sidewalls that deform; one able to grip a boat winch handle, and the other able to grip a beverage can. It is possible that the side walls may have accordion-type folds, enhancing their ability to deform. When a winch handle and/or beverage can is inserted into the holder, the housing sidewalls expand outwardly for accommodation.

Both housings have notched upper rims to facilitate insertion and retrieval of a winch handle or beverage can, and each also has a bottom side with a drain hole. The winch handle housing is tapered from top to bottom for an improved fit. The holder can be installed at multiple locations, including at the site of a conventional winch handle holder using a plurality of fasteners, on a sheet bag, or may even be incorporated directly into the boat.

The sidewalls are made of flexible and stretchable material so the holder can grasp items inserted therein. Since the shorter and wider beverage can housing is able to attach to the sidewall of the winch handle housing, both items are kept in close proximity without interference. Ideally the first housing, second housing or both are made of ultraviolet protected PVC.

DESCRIPTION

Figure 1:
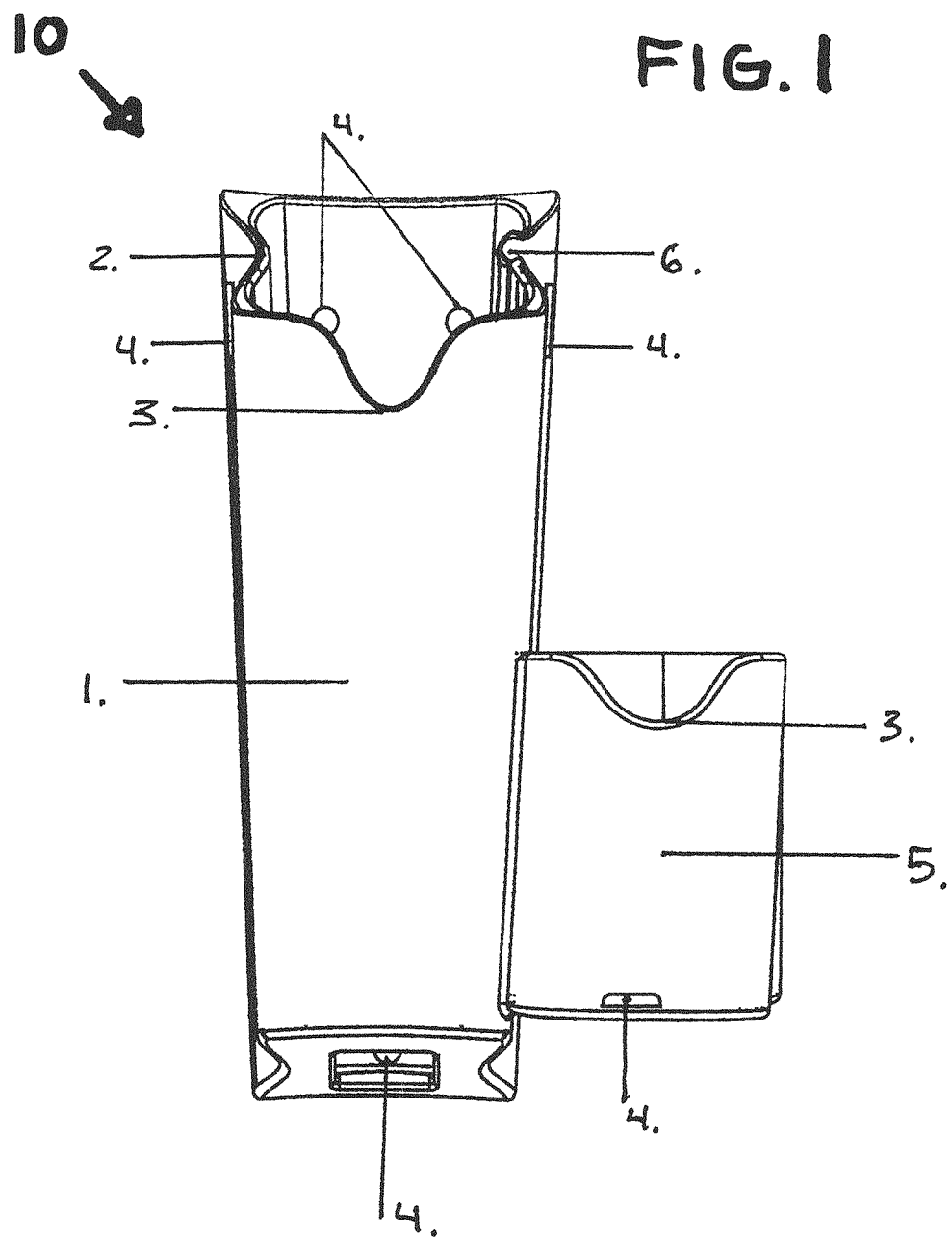
FIG. 1 is a front view of the combination winch handle holder and beverage can holder of the preferred embodiment.
Figure 2:
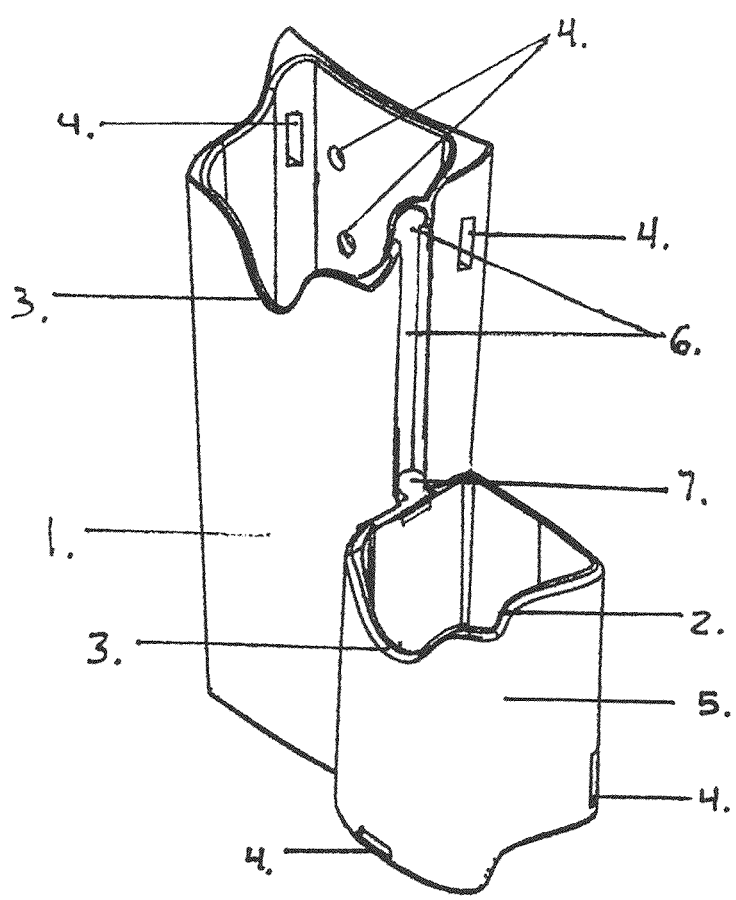
FIG. 2 is a perspective view of the combined winch handle holder and beverage holder.
Figure 3:
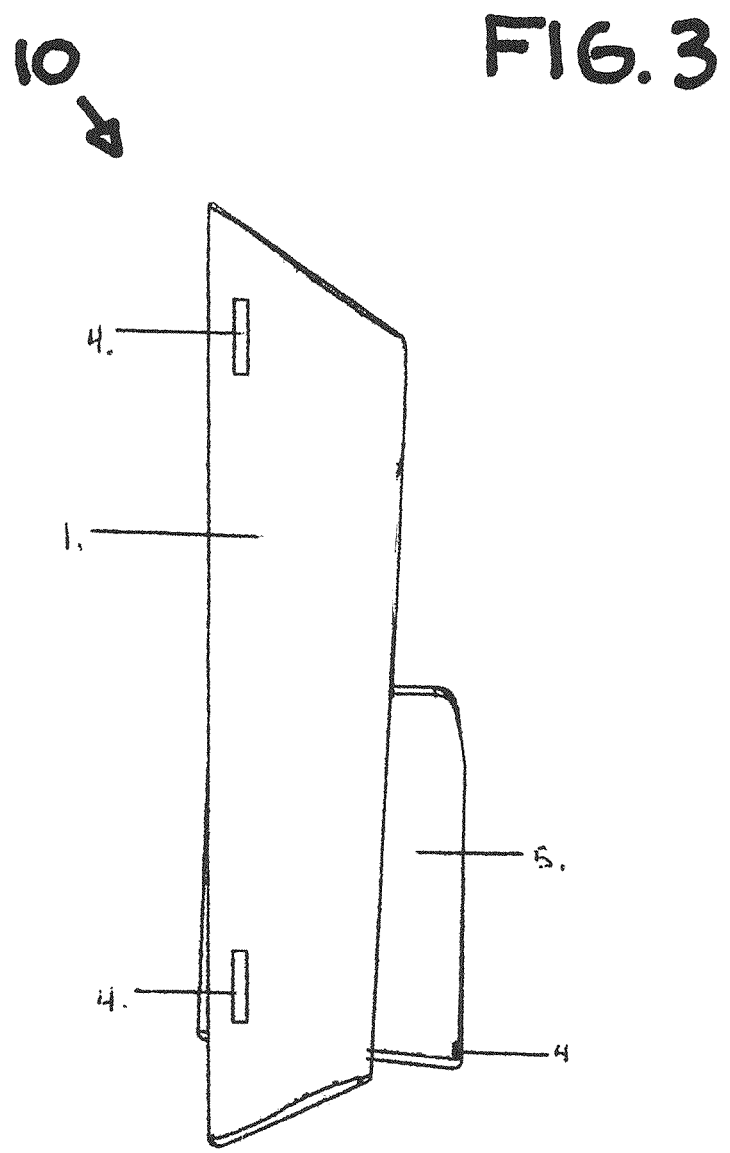
FIG. 3 is a right side view of the combined winch handle holder and beverage holder.
Figure 4:
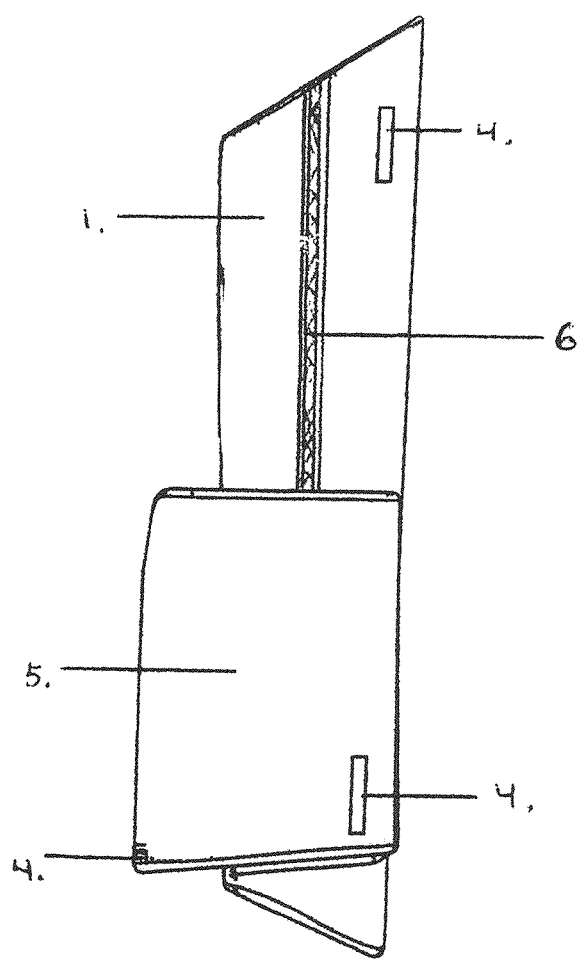
FIG. 4 is a left side view of the combined winch handle holder and beverage holder.
Figure 5:
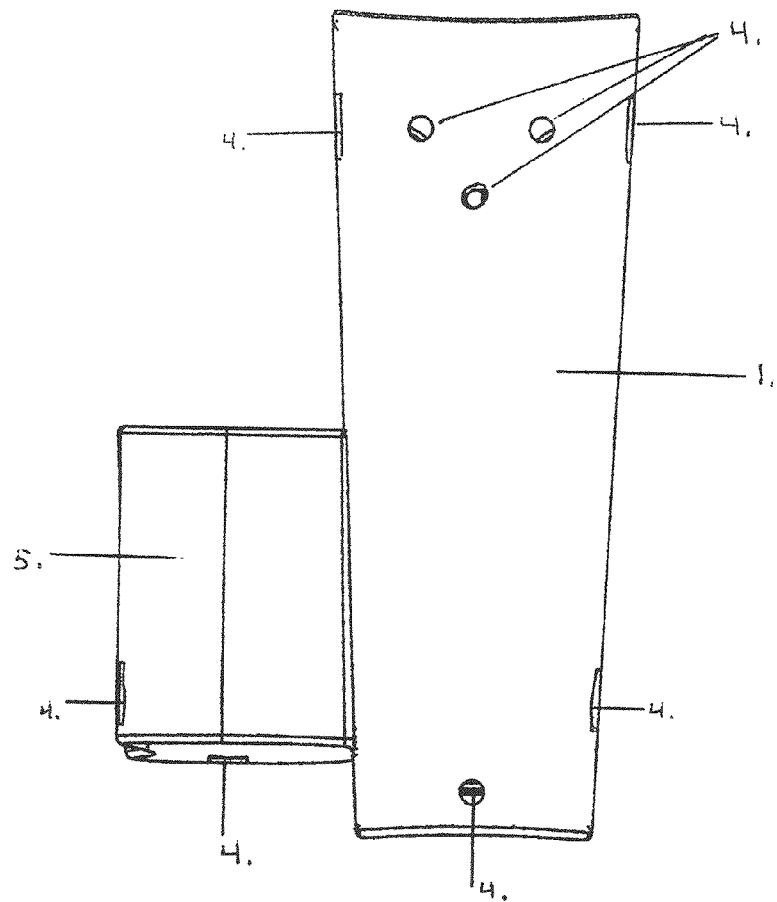
FIG. 5 is a back view of the combined winch handle holder and beverage holder.
Figure 6:
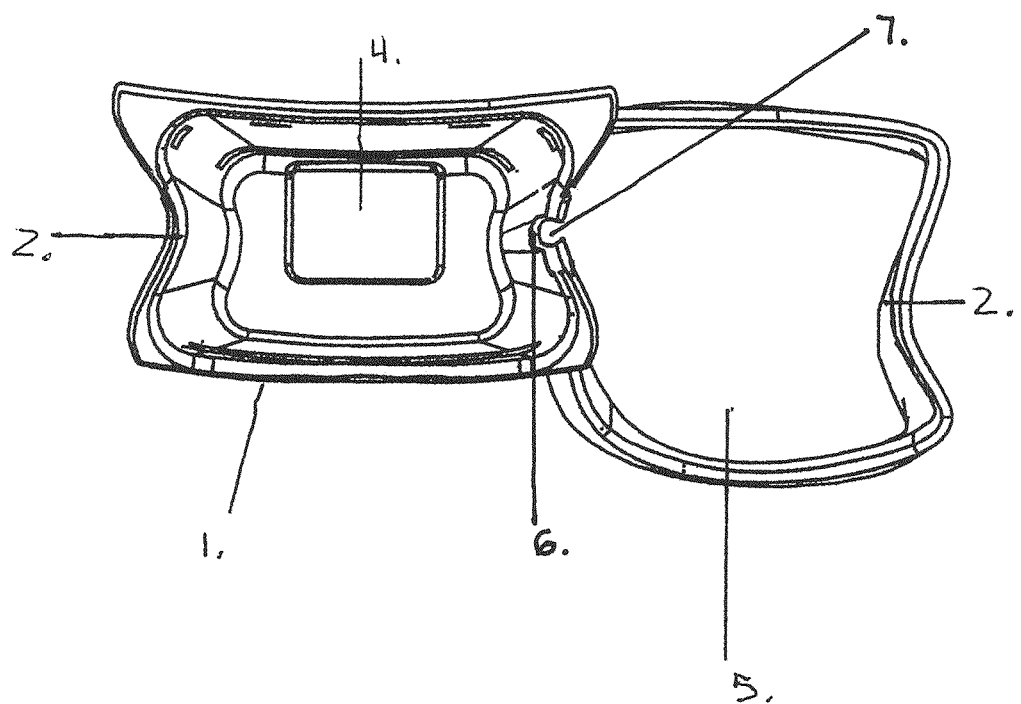
FIG. 6 is a top view of the combined winch handle holder and beverage holder.
Figure 7:
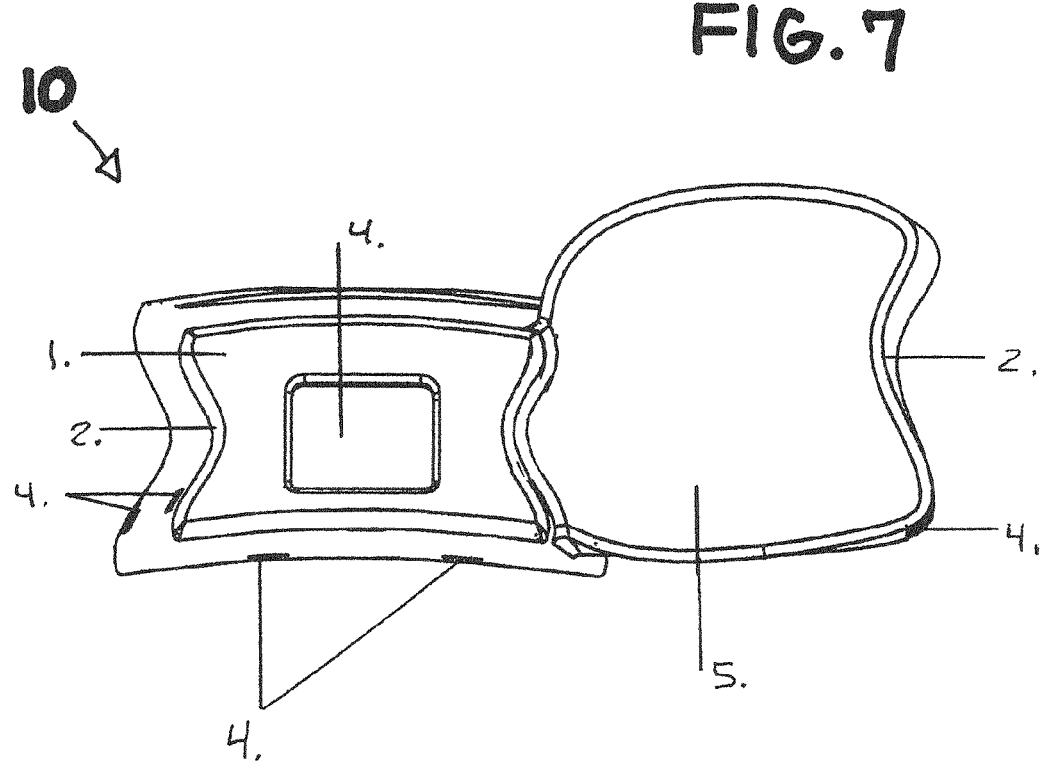
FIG. 7 is a bottom view of the combined winch handle holder and beverage holder.
Figure 8:
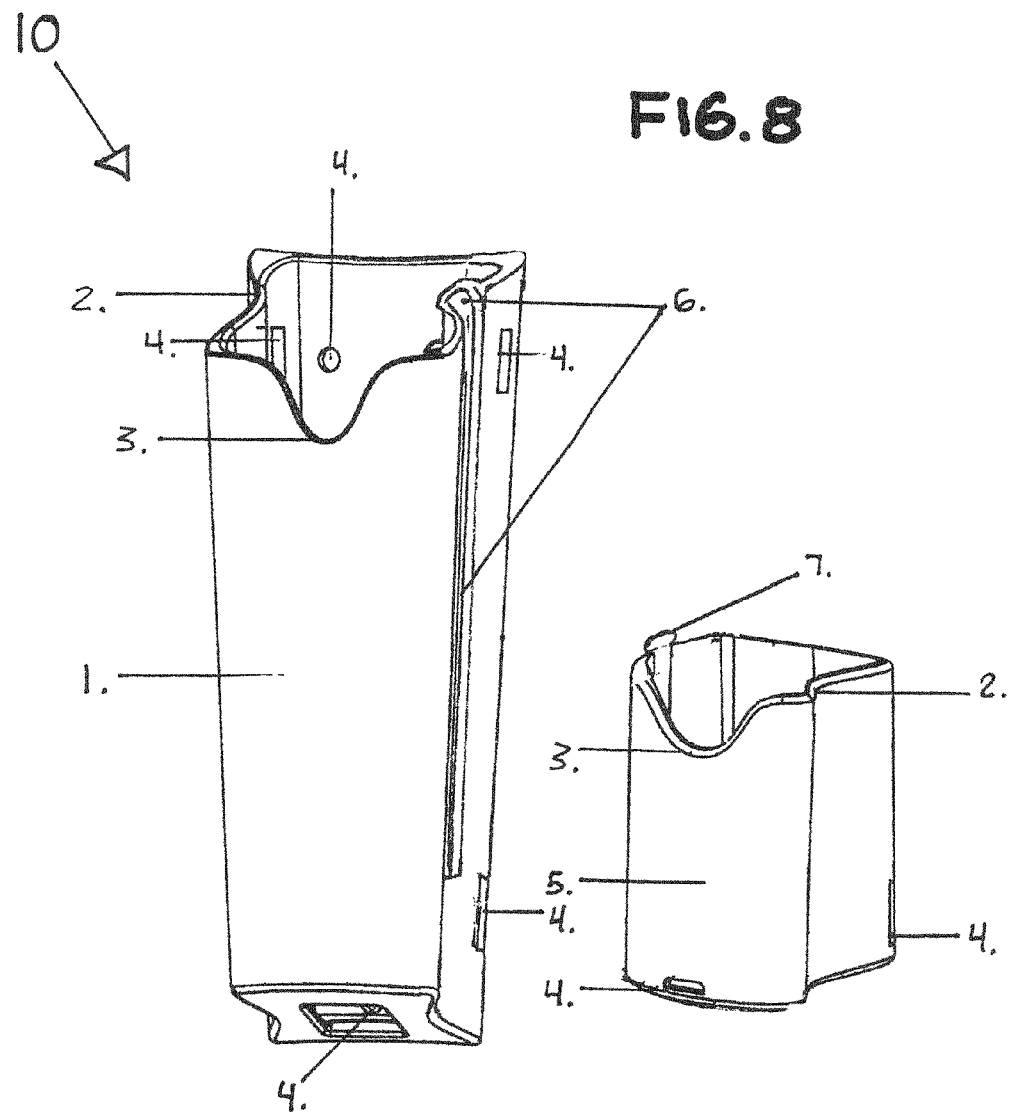
FIG. 8 is a perspective view of the combined winch handle holder and beverage holder, with the beverage container holder removed from the winch handle holder.

Referring to the drawing, the preferred embodiment is designated generally by the numeral 10. The Sailboat winch handle holder and beverage or similarly-sized item holder 10 is composed generally of a larger winch handle holder housing 1 and a smaller beverage or similarly sized item housing 5 attached to the primary housing 1 any number of ways. The device 10 has cut outs or voids 3 on the front side of both the main 1 and secondary pockets 5 to allow easy placement and retrieval of items. The device 10 has specifically placed holes and voids 4 to allow drainage and multiple mounting options. The device 10 incorporates a specific body shape and tapered design elements 2 to aid in holding said objects in place.

The preferred embodiment 10 is designed to hold a winch handle in the main body/pocket 1 and a beverage or similarly sized item or items in the attached secondary pocket 5, allowing the user to hold multiple items simultaneously in one cohesive unit. The unit 10 is also designed to mount using the existing holes for the old and often obsolete winch handle holders that exist on so many boats worldwide eliminating the need to drill additional holes in the boat. The unit 10 can also be mounted inside of the sheet bags that are located in the cockpit of many vessels, helping to keep the deck safe and clutter free, while still providing a quickly accessible location for the winch handles and a convenient spot for a beverage or other items.

The preferred embodiment 10 is designed with a tapered main body 1 that allows the winch handle to fit inside of the pocket relying on the tapered shape of the unit to aid in holding the winch handle securely in place. It also has a specifically designed cut out, or void 3 on the front face of the main holder to aid in putting the handle into the pocket and the retrieval of said handle. It also incorporates multiple holes and voids 4 into its design to facilitate drainage and allow multiple mounting options. The secondary pocket 5 or pockets feature the same cut out and voids 4 and are designed to flex or expand in size to aid in the securing of a beverage or similarly sized item.

The preferred embodiment 10 can be made in a number of variations. As one cohesive unit that incorporates the winch handle holder and a beverage/pocket or pockets into one functional unit. This would be comprised of the main body winch handle holder 1, which is larger and deeper to accommodate a winch handle.

The secondary pocket 5 or pockets would be built on one or all of the outward facing sides of the main winch handle holder housing to accommodate a typical beverage such as a can, cup, glass, bottle or any similarly sized item. They are shorter and wider by design to aid in holding the beverages and other similar sized items securely.

The preferred embodiment 10 can also be made as a component type system. In this system the primary winch handle holder body 1 would be built with a slot/track 6 or a cassette like system built into its design on any one of the outer pocket walls.

The secondary beverage holder/pocket 5 would be built with a sliding car or "male" track type system 7 on one of its available faces. Designed to slide or mechanically attach to the main winch handle holders 1 slot or track system 6 on the main winch handle pocket 1. This would slide into the main body's 1 track 6, allowing the secondary pocket 5 or pockets to mechanically attach to one or all of the outward facing surfaces of the main winch handle holder 1. This system would allow the user to add or remove the number of pockets to fit their specific needs or requirements.

The preferred embodiment 10 can also be attached to the vessel using double sided tape or a hook and loop type fastener. Another option for installation with the cassette or track type system would incorporate the boat being built or modified to accept the slot/track system. This type of specific system would allow the user to connect the system directly to the vessel, The preferred embodiment may be constructed from any conventional or exotic material using injection molding or cnc construction but not limited. A flexible plastic or PVC material, which is environmentally stabilized to resist harsh sun and sea conditions including ultraviolet light, is the preferred material.

While the present invention has been described with regards to particular embodiments, it is recognized that additional variations of the present invention may be devised by persons skilled in the art without departing from the inventive concepts disclosed herein.

What is claimed is:

1. A holder for a boat winch handle and a beverage can on a boat comprising a first housing attachable to the boat; a second housing slidably attached to and directly abutting said first housing; and wherein said first housing comprises deformable sidewalls adapted to hold the boat winch handle, and wherein said second housing comprises deformable sidewalls adapted to hold the beverage can, wherein the winch handle and the beverage can are conveniently stored adjacent each other; and wherein said first housing and said second housing each have a bottom side with a drain hole.

2. A combination boat winch handle holder and beverage can holder comprising: a first housing having a tapered shape, accordion folding sides, a notched rim and a bottom with a drain hole for holding the winch handle and having a plurality of fastener holes corresponding to a winch handle holder mounting position; a second housing having accordion folding sides and a notched rim for holding the beverage container, said second housing releasably connected to said first housing; whereby the beverage container can be conveniently stored proximate the winch holder without interfering with storage of the winch holder.

3. The holder of claim 2 wherein the second housing has a bottom side with a drain hole.

4. The holder of claim 2 wherein said first housing and said second housing are releasably connected by a track system.

5. The holder of claim 2 wherein said boat winch handle holder is made of flexible expandable material.

* * * * *